United States Patent [19]
VerKamp

[11] Patent Number: 5,521,799
[45] Date of Patent: May 28, 1996

[54] ILLUMINATED DISPLAY ASSEMBLY

[76] Inventor: Kevin M. VerKamp, 3116 Tulip Ave., Bloomington, Ind. 47403

[21] Appl. No.: 296,123

[22] Filed: Aug. 25, 1994

[51] Int. Cl.⁶ .................................................. B60Q 1/56
[52] U.S. Cl. ..................... 362/83.2; 362/225; 362/226; 362/240; 362/247; 362/249; 362/812; 40/205
[58] Field of Search .................................... 362/83.2, 225, 362/226, 235, 236, 240, 241, 247, 248, 249, 812; 40/204, 205, 206

[56] References Cited

U.S. PATENT DOCUMENTS

| | | | |
|---|---|---|---|
| 2,025,952 | 12/1935 | Levet | 40/205 |
| 2,689,948 | 9/1954 | Rothman | 362/83.2 |
| 4,479,172 | 10/1984 | Connor | 362/240 |
| 4,857,890 | 8/1989 | Solow | 362/83.2 |
| 5,027,262 | 6/1991 | Freed | 362/247 |

FOREIGN PATENT DOCUMENTS

| | | | |
|---|---|---|---|
| 553347 | 6/1932 | Germany | 40/205 |
| 499811 | 11/1954 | Italy | 40/205 |
| 512184 | 1/1955 | Italy | 40/205 |
| 570575 | 12/1957 | Italy | 40/204 |

*Primary Examiner*—Denise L. Gromada
*Assistant Examiner*—Alan B. Cariaso
*Attorney, Agent, or Firm*—Willian Brinks Hofer Gilson & Lione

[57] ABSTRACT

A license plate sized, light-transmitting, indicia plate is uniformly illuminated and carried in the available license plate mounting area of a vehicle. The light-transmitting plate is spaced and supported from the vehicle, preferably by a housing and a lighting assembly is carried within the supporting housing and provides substantially uniform illumination of the indicia plate with a plurality of lighting devices, electrically and mechanically carried in a spaced array by the supporting means. The resulting illuminated display can provide an eye-catching and attractive decoration of the available license plate area of a vehicle with all of the various indicia used in the past by vehicle owners to advertise their associations with various organizations, or with clever slogans and statements, cartoons and other such alphanumeric and pictorial indicia.

19 Claims, 4 Drawing Sheets

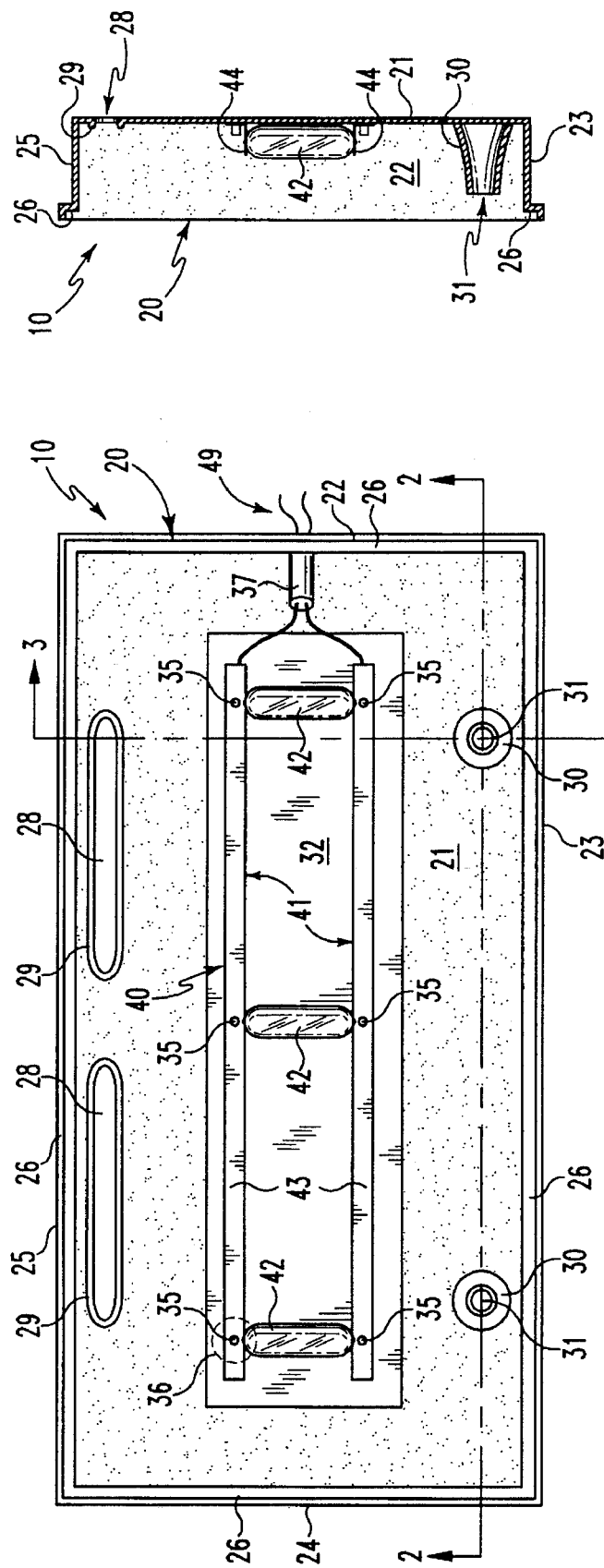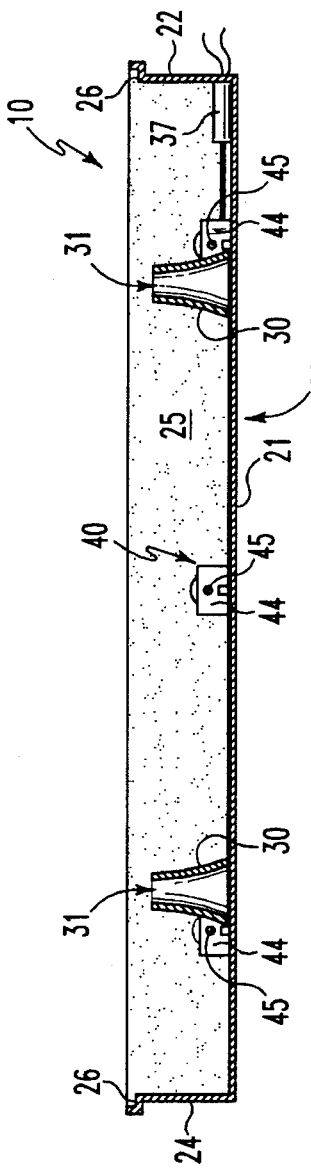

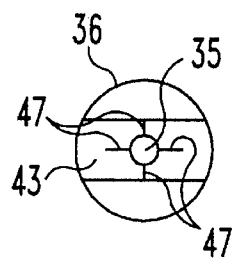 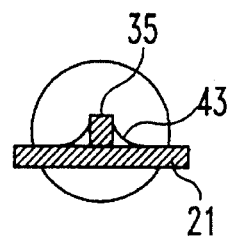
Fig. 4a    Fig. 4b
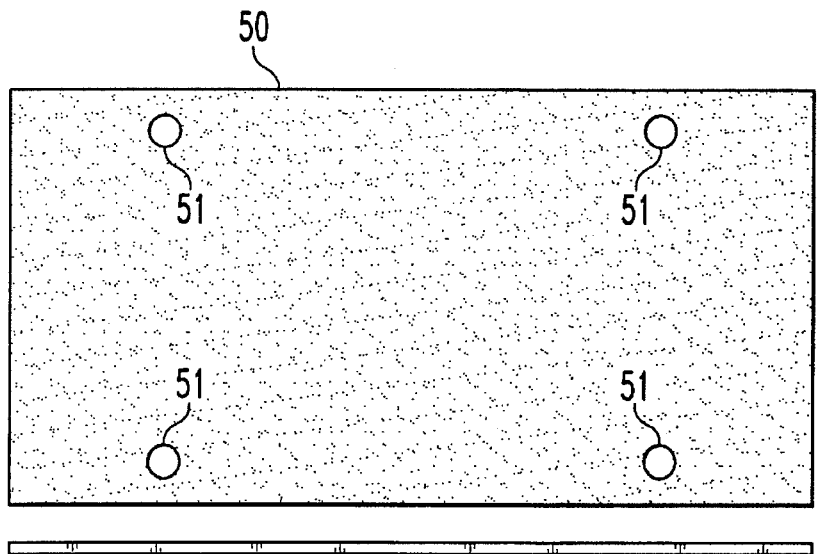
Fig. 5
Fig. 6
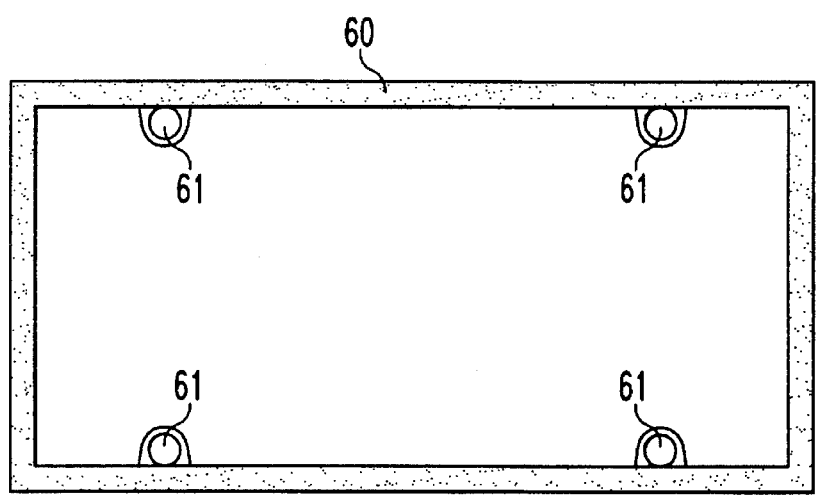 
Fig. 7    Fig. 8

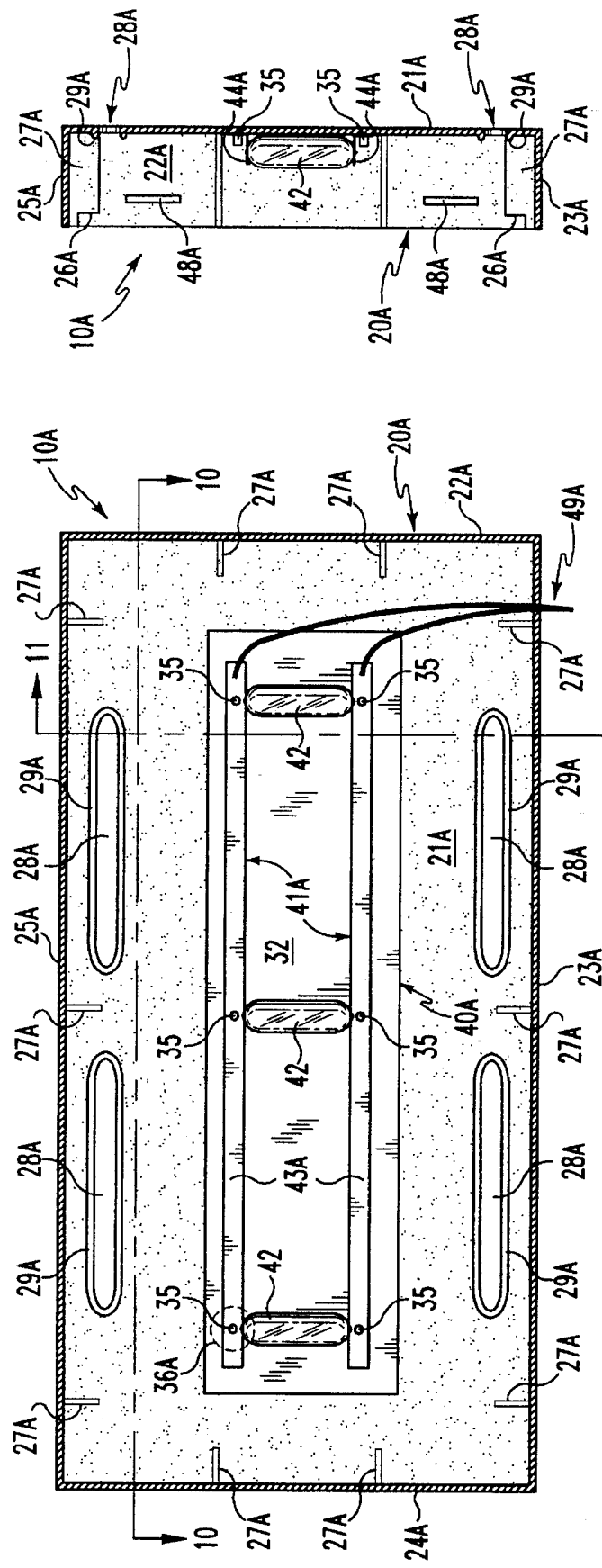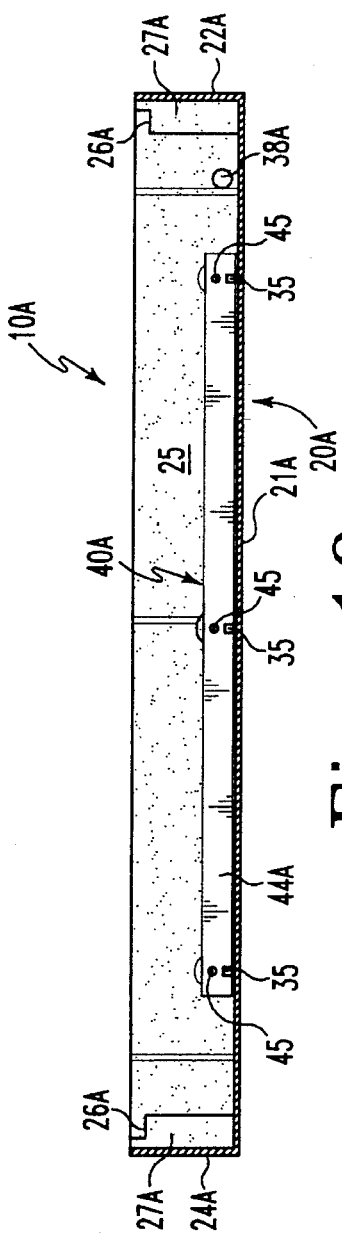

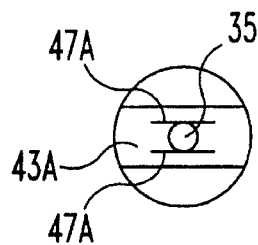
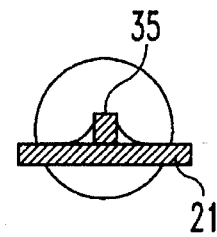
Fig. 12a        Fig. 12b
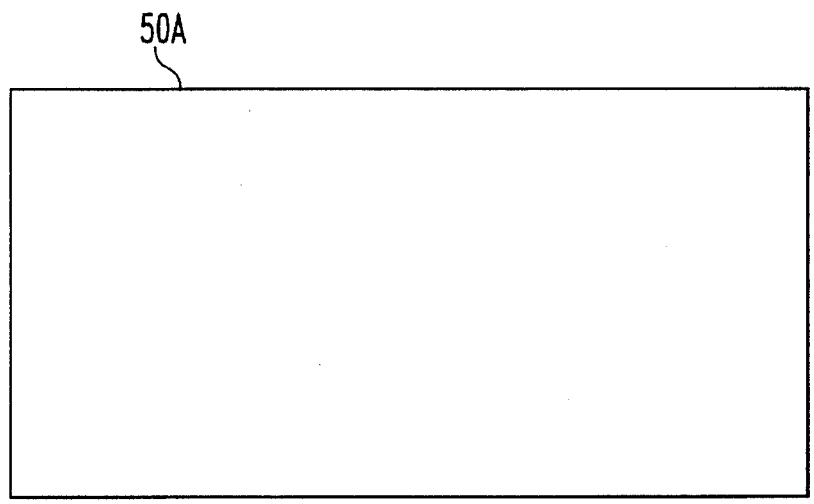
Fig. 13
Fig. 14
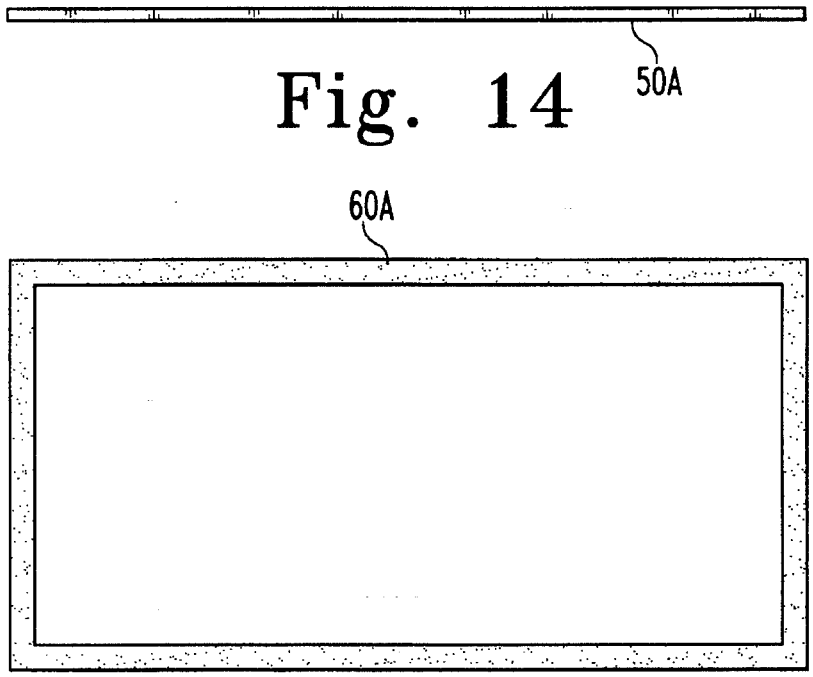
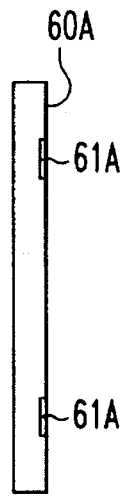
Fig. 15        Fig. 16

ILLUMINATED DISPLAY ASSEMBLY

FIELD OF THE INVENTION

This invention relates to means for providing an illuminated display at the license plate area of a vehicle, and more particularly, relates to means for carrying an illuminated, light-transmitting, indicia bearing plate in place of a vehicle license plate.

BACKGROUND OF THE INVENTION

In recent years, states have required that vehicles carry a single license plate, while vehicles continue to be manufactured with license plate mounting areas, generally on vehicle bumpers, at both the front and the back of the vehicle. Thus, vehicles have a license plate mounting area available for the mounting of decorative plates having various indicia other than state license numbers. The available license plate mounting area is frequently used by the owner of the vehicle to display plates carrying such various indicia as names and logos of universities and high schools, lodges and fraternal organizations, slogans, cartoons and other alphanumeric and pictorial displays.

SUMMARY OF THE INVENTION

The invention provides means for carrying and illuminating a license plate sized, light-transmitting indicia plate in the available license plate mounting area of a vehicle. The resulting illuminated display can provide an eye-catching and attractive decoration of the available license plate area of a vehicle with all of the various indicia used in the past by vehicle owners to advertise their associations with various organizations, or with clever slogans and statements, cartoons and other such alphanumeric and pictorial indicia.

In the invention, a first means supports a light-transmitting plate spaced from the vehicle, and a second means is carried by the supporting means and provides substantially uniform illumination of the indicia plate with a plurality of lighting devices, electrically and mechanically carried in a spaced array by the supporting means.

The first supporting means is, preferably, a housing with dimensions about the size of a vehicle license plate, and the indicia plate is preferably a translucent plate carried by the housing. The second illumination means is carried within the housing and preferably comprises electrical and mechanical connection means for providing a spaced array of a plurality of light devices that are connectable, through the electrical and mechanical connection means, with the vehicle electrical system. In preferred embodiments of the invention, the electrical and mechanical connection means include a pair of substantially parallel connection plates carried by the housing and mechanically locating and supporting the plurality of lighting devices in a spaced array and electrically connecting the lighting devices with the vehicle. Such parallel connection plates can be formed by resilient metal angle brackets, carried by the housing with one upstanding side that includes a spaced array of connection openings for electrical and mechanical engagement with the plurality of lighting devices. A light reflective surface can, if necessary, be provided between the electrical and mechanical connection means and behind the spaced array of lighting devices. The housing can include means for engaging and locating the pair of parallel connection plates and any plate that may be needed to the form a light reflective surface. The parallel connection plates can include resilient, housing-engaging portions for fastening such on a light-reflective plate and the parallel connecting plates to the housing.

A variety of means can be used to fasten the indicia plate to the housing, which may be conveniently and inexpensively injected molded to provide surfaces for engagement with the indicia plate and contained illumination means. For example, a plate frame can be provided with resilient engagement means for attachment to the housing and for fastening the indicia plate to the housing.

Other features and advantages of the invention will be apparent from the drawings and the more detailed description that follows.

DETAILED DESCRIPTION OF THE DRAWINGS

FIGS. 1–8 illustrate one embodiment of the invention;

FIG. 1 is a view from above the illuminated display assembly of the invention with the indicia plate and its fasteners omitted;

FIG. 2 is a cross-sectional view from one side taken at a plane including line 2—2 of FIG. 1;

FIG. 3 is a cross-sectional view of FIG. 1 from another side taken at a plane including line 3—3 of FIG. 1;

FIGS. 4A and 4B are enlarged views of the area of FIG. 1 indicated by 36 and a cross-sectional view thereof, respectively, to illustrate one fastening means included in the invention;

FIG. 5 is a plan view of an indicia plate for use with the embodiment of FIGS. 1–8;

FIG. 6 is a side view of the indicia plate of FIG. 5;

FIG. 7 is a plan view of a plate frame;

FIG. 8 is an end view of the plate frame of FIG. 7;

FIGS. 9–16 illustrate an alternate embodiment of the invention;

FIG. 9 is a view from above the alternate embodiment of the invention with the indicia plate and its fastener omitted;

FIG. 10 is a cross-sectional view from one side of FIG. 9 taken at a plane including lines 10—10 of FIG. 1;

FIG. 11 is a cross-sectional view from another side taken at a plane including lines 11—11 of FIG. 1;

FIGS. 12A and 12B are enlarged and cross-sectional views, respectively, of another embodiment of fastening means included in the invention;

FIG. 13 is a plan view of an indicia plate for use with the embodiment of FIGS. 9–16;

FIG. 14 is a side view of the indicia plate of FIG. 13;

FIG. 15 is a plate frame for use with the embodiments of FIGS. 9–16; and

FIG. 16 is a side view of the plate frame of FIG. 15;

DETAILED DESCRIPTION OF THE BEST MODE OF THE INVENTION

FIGS. 1–16 illustrate alternate preferred embodiments of the invention. In the drawings, corresponding elements of the invention are provided with the same element numbers, the corresponding but different elements of the alternate embodiment of FIGS. 8–16 being provided with an "A" suffix.

As shown in FIGS. 1–16 and described further below, an illuminated plate display assembly 10, 10A of the invention comprises first means 20, 20A for carrying a second illumination means 40, 40A, and an indicia plate 50, 50A in a vehicle license plate mounting area.

The indicia plate 50, 50A which is shown in FIGS. 5, 6, 13 and 14 comprises a light-transmitting plate, which is preferably translucent and capable of accepting decalcomania, and inks and paints used in the application of alphanumeric and pictorial indicia by silk screening processes, air-brushing and the like. Such an indicia plate is most preferably a 3 mm thick, milk-white, translucent, methylmethacrylic material, like that sold by E. I. DuPont under their LUCITE trademark. The light diffusion through such a material enhances its substantially uniform illumination.

The first means 20, 20A supports the indicia plate 50, 50A from the vehicle, and the second means 40, 40A is carried by the supporting means 20, 20A and provides substantially uniform illumination of the indicia plate 50, 50A. As shown in FIGS. 1–3 and 9–11, the first supporting means 20, 20A preferably forms a housing with dimensions about the size of a vehicle license plate. The housing 20 is preferably an injection molded plastic box including a bottom 21, 21A and four sides 22–25, 22A–25A. The housing 20, 20A further provides supporting surfaces 26, 26A for the indicia plate, which, in the preferred housing 20 of FIGS. 1–3, comprises a ledge 26 formed adjacent the top of sides 22–25 around the periphery of the housing. In the housing 20A of FIGS. 9–11, the plate supporting surfaces comprise the top surfaces of 26A of a plurality of vertical side reinforcements 27A formed at the sides 22A–25A. The housing 20, 20A is thus adapted for supporting the indicia plate adjacent its top and directly over the illumination means 40, 40A.

In addition, the housing 20, 20A may be conveniently provided with openings 28, 28A having reenforced edges 29, 29A which may be used for fastening the illuminated display assembly 10, 10A to the license plate mounting area of a vehicle. The housing 20 of FIGS. 1–3 further comprises a plurality of cylindrical portions 30 projecting upwardly from the bottom of the housing and forming a plurality of screw-accepting bores 31.

The second means 40, 40A for illuminating the indicia plate provides electrical and mechanical connection means 41, 41A for providing a spaced array of lighting devices 42. The electrical-mechanical connection means 41, 41A preferably provides a pair of unitary, elongated, parallel connection plates 41, 41A carried by housing 20, 20A for mechanically locating and supporting and for providing electrical connection to a plurality of spaced lighting devices 42. The electrical-mechanical connection means 41, 41A are preferably made from a resilient metal angle bracket, preferably an L-bracket, with one side 43, 43A carried by the housing 20, 20A and the other side 44, 44A extending upwardly and provided with a spaced array of connection openings 45 for mechanical support and electrical connection of the lighting devices 42. In the embodiment of FIGS. 1–3 the connection means 41 are formed by an angle bracket including a plurality of resilient upstanding sides 44, each of which is provided with connection opening 45. In the embodiment of FIGS. 9–11, the connection means 41A are formed with a long, parallel, upstanding, substantially parallel plates 44A, each of which includes the plurality of spaced connection openings 45. The lighting devices 42 of the illustrated embodiments are preferably of the type used for dome lights in automobiles, for example, Chieftain Auto Parts, No. 3423, which is the 12 volt, 5 watt bulb having an elongated tubular glass housing with its electrical connections at the opposite ends of the tubular glass housing. Of course, other 12 volt lighting devices may be used. As will be described, the plurality of lighting devices 42 are connectable, through the elongated electrical-mechanical connection means 41, 41A, with the electrical system of the vehicle for power to illuminate the indicia plate. In both embodiments, the array of lighting devices 42 provides a spacing for uniform illumination of the indicia plate 50, 50A carried by the housing 20, 20A.

To further enhance the uniformity of the illumination, the housing 20, 20A may be provided with a light reflective surface 32 lying between the connection means 41, 41A and below the lighting devices 42. Where the housing 20, 20A is manufactured from a non-light reflective material, or in a non-light reflective color, the illuminated display assembly 10, 10A may be provided with a separate plate 32 either manufactured from a light reflective material or provided with a light reflective surface. Such a plate may, for example, be stamped from a thin white plastic sheet.

The second means 40, 40A may be conveniently located and fastened within the housing 20, 20A through a plurality of upwardly projecting mounting posts 35 formed at the bottom of the housing. These mounting posts 35 are illustrated in FIGS. 4 and 12, which are enlarged illustrations of the areas 36 and 36A of FIGS. 1 and 9, respectively. As illustrated in FIGS. 1 and 9, the connection means 41, 41A can be provided with a plurality of post-engaging portions for mounting the connection means 41, 41A to the mounting posts 35 on the bottom 21, 21A of the housing 20, 20A. As shown in FIGS. 12A and 12B, the post-engaging portions of the connection means 41 can comprise small holes with intersecting cruciform cuts 47 in their sides 43 to form a plurality of deformable post-engaging portions that are resiliently deformed as the sides 43 are pressed onto posts 35 and through their resilience and sharp edges fasten the connection means 41 to the housing bottom 21. FIGS. 4A and 4B show another manner of providing the connection means with post-engaging portions including parallel cuts 47A adjacent the small holes to similarly form resilient deformable post-engaging portions of the connection means 43A. Where the light reflective surface 32 is formed by a separate plate, the separate plate may be provided with a plurality of holes located to permit it to be placed over the plurality of posts 35 and thereafter retained in the housing 20, 20A by the connection means 41, 41A through the engagement of their post-engaging portions with the plurality of posts 35.

As shown in FIGS. 1 and 2, the bottom 21 of the housing 20 may form a conduit portion 37 by molding the bottom with a small portion of the bottom displaced upwardly to form an opening and passageway. As an alternative, the housing may be provided with a hole, as shown by 38A of the housing 20A.

FIGS. 5 and 6 show an indicia plate 50 including a plurality of holes 51 spaced to mate with the bores 31 and openings 28 of housing 20.

FIGS. 7 and 8 show a plate frame 60, which can be a standard license plate frame of the type that may be purchased at any auto parts store. The plurality of holes 61 in the plate frame 60 mate with a plurality of holes 51 in the indicia plate 50 and with the bores 31 and openings 28 of the housing 20. The indicia plate 50 is placed on the plate supporting ledge 26 of the housing 20 and is attached to the housing 20 with a pair of screws that pass through the lower holes 51 and engage the internal sides of the cylinders 30 formed by the bores 31. The illuminated display assembly 10 may thereafter be mounted to a vehicle license plate mounting area through the upper holes 51, and electrical wires 49 from connection means 41 can be connected to the vehicle's electric power source, preferably in parallel with the vehicle headlights connections or taillight connections.

Of course, the plate frame 60 may be fastened over the indicia plate 50.

In the embodiment of FIGS. 9–11, the illuminated display assembly 10A is fastened to the license plate area of the automobile through a plurality of threaded fasteners, including, if necessary, washers, through the housing openings 28A and into the vehicle license plate supporting surface.

FIGS. 13 and 14 show an indicia plate 50A for the alternate housing 20A of FIGS. 9–11. FIGS. 15 and 16 show a plate frame 60A which is used with the housing 20A of FIGS. 9–11 to hold the indicia plate 50a in the illuminated display assembly 10.

As indicated in FIG. 11, sides 22A and 24A are provided with a plurality of engagement openings 48A and the plate frame 60A is provided with a plurality of engagement tabs 61A that are adapted for resilient engagement with the engagement openings 48A of the housing 20A. In completing the illuminated display assembly 10A, the indicia plate 50A is placed within the sides of the housing 20A on the plurality of supporting surfaces 26A formed about the periphery of the housing. Plate frame 60A is thereafter snapped into engagement with the housing 20A to hold the indicia plate 50A in place. Illuminated display assembly 10A of FIGS. 9–16 can thus be attached to a vehicle without the appearance of threaded fasteners and can provide easy and convenient interchange of the illuminated indicia by the replacement of indicia plates 50A.

Of course, housing 20 of FIGS. 1–3 can be modified to accept an indicia plate such as that shown in FIGS. 13 and 14 and a plate frame such as that shown in FIGS. 15 and 16 if desired. In addition, the second means 40 of FIGS. 1–3 may be used with housing 20A and the second means 40A of FIGS. 9–11 may be used with housing 20.

Although the invention has been described with reference to several preferred embodiments believed to be the best modes of the invention, variations and modifications exist within the scope of the invention defined by the following claims and the prior art.

I claim:

1. Means for carrying and illuminating a light-transmitting indicia plate in place of a vehicle license plate, comprising:

a housing with dimensions about the size of a vehicle license plate, light-transmitting indicia plate carried by said housing, and means, carried within said housing, comprising a pair of unitary, elongated, electrical and mechanical connection means for providing a spaced array of a plurality of lighting devices connectable, through said pair of unitary elongated electrical and mechanical connection means, with a vehicle electrical system, each said connection means including an angled bracket having one side attached to said housing, and a second side extending from said first side for suspending said lighting devices out of a plane passing through said one sides, and said spaced array of lighting devices providing substantially uniform illumination of said light transmitting indicia plate permitting illuminated display of indicia on said plate.

2. The means of claim 1 wherein each of said pair of unitary elongated electrical and mechanical connection means comprises a resilient metal angle bracket carried by said housing with an upstanding, spaced array of connector openings for electrical and mechanical engagement of said plurality of lighting devices.

3. Means for carrying and illuminating a light-transmitting indicia plate in place of a vehicle license plate, comprising:

a housing with dimensions about the size of a vehicle license plate, light-transmitting indicia plate carried by said housing, and means, carried within said housing, comprising a pair of unitary, elongated, electrical and mechanical connection means for providing a spaced array of a plurality of lighting devices connectable, through said pair of unitary elongated electrical and mechanical connection means, with a vehicle electrical system, said spaced array of lighting devices providing substantially uniform illumination of said light transmitting indicia plate permitting illuminated display of indicia on said plate, wherein each of said pair of unitary elongated electrical and mechanical connection means comprises a resilient metal angle bracket carried by said housing with an upstanding, spaced array of connector openings for electrical and mechanical engagement of said plurality of lighting devices, and wherein said housing includes a light reflective surface, and said pair of resilient metal angle brackets are carried within said housing by their one sides with their other sides forming said connection openings and extending substantially parallel on opposite sides of the light reflective surface, and said spaced array of lighting devices are carried between the substantially parallel sides of the resilient metal angle brackets and over the light reflective surface.

4. The means of claim 1 further comprising a plate frame including side portions with resilient engagement tabs, and wherein said housing has a plate-supporting surface for location of said light-transmitting indicia plate adjacent the housing top and openings to accept the engagement tabs of said plate frame, said plate frame from being removably attachable to said housing to fasten thereto said light-transmitting indicia plate and permit convenient access to the interior of the housing.

5. The means of claim 3 wherein said housing includes means for engaging and locating said pair of resilient metal angle brackets, wherein said resilient metal angle brackets include a plurality of resilient housing engagement portions in their one sides for fastening said brackets to said housing.

6. An illuminated plate display for vehicle, comprising:

first means for supporting an indicia plate spaced from the vehicle, and second means, carried by said supporting means, for providing substantially uniform illumination of said indicia plate with a plurality of lighting devices comprising a pair of parallel connection plates forming a plurality of connections openings, resiliently carried by said supporting means, for mechanically locating and supporting and electrically connecting said plurality of lighting devices in a spaced array, each said connection plate including an angled bracket having one side attached to said supporting means, and a second side extending from said one side for suspending said lighting devices out of a plane passing through said one sides, said pair of parallel connection plates being electrically connectable with an electrical source of the vehicle for substantially uniform illumination of said indicia plate.

7. The illuminated plate display of claims 6 wherein said first means for supporting a translucent plate includes a light reflective and electrically insulating surface on which said pair of parallel connection plates are carried.

8. An illuminated plate display for a vehicle, comprising:
first means for supporting an indicia plate spaced from the vehicle, and
second means, carried by said supporting means, for providing substantially uniform illumination of said indicia plate with a plurality of lighting devices comprising a pair of parallel connection plates forming a plurality of connections openings, resiliently carried by said supporting means, for mechanically locating and supporting and electrically connecting said plurality of lighting devices in a spaced array,
each of said pair of parallel connection plates of said second means comprising a resilient elongate L-bracket with one side attached to said supporting means and the other side forming said connection openings in portions projecting resiliently upward for electrical and mechanical engagement of the plurality of lighting devices,
said pair of parallel connection plates being electrically connectable with an electrical source of the vehicle for substantially uniform illumination of said indicia plate.

9. The illuminated plate display of claims 6 wherein said first supporting means comprises a housing encompassing said second means and providing openings permitting said first means to be fastened to the license plate mounting area of a vehicle, and the indicia plate to be fastened to the housing.

10. An illuminated plate display for a vehicle, comprising:
first means for supporting an indicia plate spaced from the vehicle, and
second means, carried by said supporting means, for providing substantially uniform illumination of said indicia plate with a plurality of lighting devices comprising a pair of parallel connection plates forming a plurality of connections openings, resiliently carried by said supporting means, for mechanically locating and supporting and electrically connecting said plurality of lighting devices in a spaced array,
said pair of parallel connection plates being electrically connectable with an electrical source of the vehicle for substantially uniform illumination of said indicia plate,
wherein said first supporting means includes at least a pair of surfaces with engagement openings, and a plate frame is provided with resilient engagement surfaces, for removable attachment of said plate frame and said indicia plate to said first supporting means.

11. Means for attaching a lighted display to the license plate area of a vehicle, comprising
an injection molded, license plate size, plastic box including a bottom and four sides, two rows of mounting posts extending upwardly from the inside of the bottom, each row including at least two spaced posts, and peripheral plate supporting means,
a light reflective plate including two rows of holes spaced to permit engagement of the two rows of mounting posts and location of said light reflective plate adjacent the inside bottom of the box,
two identical, resilient, electrically conductive L-brackets, each L-bracket including, on one side, at least two post-engaging portions spaced for engagement with the two spaced posts of one of the rows of mounting posts, each L-bracket including on its other side a plurality of connection openings adapted to engage one terminal of a lighting device,
one of said L-brackets having its post-engaging portions placed downwardly over the mounting posts of one of the rows inside of the bottom of the box, and the other of said L-brackets having its post-engaging portions placed downwardly over the mounting posts of the other of said rows, whereby the deformation and resilience of the post-engaging portions of said L-brackets and their engagement with the plastic mounting posts fasten the L-brackets and light reflective plate to the bottom of the box interior,
the other sides of the L-brackets and their pluralities of connection openings extending in a substantially parallel aligned relationship whereby the resilience and electrical conductivity of the L-brackets provides mechanical support and electrical connection from a vehicle power source to an array of lighting devices extending across the box above the light reflective plate,
the box including means for carrying of a translucent, indicia-bearing plate and for attachment of the box to a vehicle.

12. The means of claim 11 wherein a conduit is formed by a displaced portion of the box bottom at one end of the box between the L-brackets.

13. The means of claim 11 wherein the post-engaging portions of the L-brackets are formed by small holes with intersecting cuts whereby the post-engaging portions of the L-brackets are deformed upwardly and engage the plastic mounting posts.

14. The means of claim 13 wherein the cuts form a cruciform about the small hole.

15. The means of claim 14 wherein the cuts are parallel and intersect the small hole.

16. The means of claim 11 wherein the peripheral plate supporting means comprise a plurality of reenforcement plates extending from the box sides with upper surfaces for supporting a translucent indicia-bearing plate.

17. The means of claim 11 wherein the peripheral plate supporting means comprises a peripheral ledge located adjacent the top of the sides of the box.

18. The means of claim 17 wherein the peripheral ledge extends around the periphery of the box.

19. The means of claim 11 wherein the sides of the box include engagement openings, and a snap cover is sized to fit over the box, the snap cover having resilient box engagement surfaces for engagement of the box engagement openings to detachably retain the snap cover on the box.

* * * * *